Nov. 7, 1961     D. E. LIPPKE     3,007,535
IMPLEMENT ATTACHING MEANS
Original Filed March 5, 1959     5 Sheets-Sheet 1

INVENTOR.
DONALD E. LIPPKE
BY
C. F. Parker and W. A. Murray
ATTORNEYS

Nov. 7, 1961 D. E. LIPPKE 3,007,535
IMPLEMENT ATTACHING MEANS
Original Filed March 5, 1959 5 Sheets-Sheet 2

INVENTOR.
DONALD E. LIPPKE

ATTORNEYS

Nov. 7, 1961         D. E. LIPPKE         3,007,535
IMPLEMENT ATTACHING MEANS
Original Filed March 5, 1959         5 Sheets-Sheet 3

INVENTOR.
DONALD E. LIPPKE
ATTORNEYS

Nov. 7, 1961  D. E. LIPPKE  3,007,535
IMPLEMENT ATTACHING MEANS
Original Filed March 5, 1959  5 Sheets-Sheet 5

*INVENTOR.*
DONALD E. LIPPKE
BY
ATTORNEYS

United States Patent Office 3,007,535
Patented Nov. 7, 1961

3,007,535
IMPLEMENT ATTACHING MEANS
Donald E. Lippke, Vandalia, Ohio, assignor to Deere & Company, Moline, Ill., a corporation of Delaware
Continuation of application Ser. No. 797,432, Mar. 5, 1959. This application Oct. 31, 1960, Ser. No. 66,342
24 Claims. (Cl. 180—14)

This invention relates to a quickly attachable coupling between a power take-off shaft of a tractor and a drive shaft on a trailing type implement. More particularly, this invention relates to a quickly attachable coupling which may be mechanically attached or detached from the operator's station on the tractor or which may be manually attached or detached. Still more particularly this invention relates to the structure forming the automatic coupling and structure positioning the coupling for alinement between the power take-off shaft and the drive shaft.

This is a continuation of application Serial No. 797,432 filed March 5, 1959 and now abandoned.

In the normal connection between the power take-off shaft of a tractor and the drive shaft on a trailing type implement, the operator is required to first position the tractor and then to dismount from the tractor and manually connect the power take-off shaft to the drive shaft. There have in some instances been designed a type of coupling which may be manually operated. However, there would be a very distinct advantage, and it is an object of the present invention, to provide a power take-off coupling between the power take-off shaft of the tractor and the drive shaft of the implement which may be attached and detached from the operator's station on the tractor.

It is further proposed as an object of the present invention to position the drive shaft and its associated coupling element by supporting the drive shaft support by structure on the tongue or draft member of the implement which will automatically position the drive shaft to the height of the power take-off shaft as the tongue is lowered and automatically release the support structure for the drive shaft when the tongue or other draft member is raised by the tractor drawbar system.

It is still a further object of this invention to provide a coupling which features a cone-shaped coupling member mounted on and facing rearwardly from the power take-off shaft with fingers extending radially from the cone surface. Mounted on the drive shaft of the implement is the second coupler member having an internal cone-shaped surface which accommodates the cone of the first coupler member. Slots or grooves are provided in the latter cone-shaped surface in order to receive the fingers of the first coupler member. A simple lock is provided to hold the fingers in the grooves when the two cone surfaces are positioned in contact with one another. A lever system extends between the coupler and the operator's station and through operation of a lever on the operator's station, the locking mechanism is released to permit separation of the two cone surfaces.

It is a further proposal to combine with the aforesaid coupling, a stand which is mounted on the forward end of the draft tongue or draft member on the implement which operates to automatically position the drive shaft on the implement to the correct height relative to the power take-off shaft on the tractor prior to detachment from the tractor. The support is then automatically locked into position prior to the tractor moving away from the implement. Upon it being necessary to recouple the implement and tractor, the drive shaft is at the precise height necessary to receive the coupler member on the power take-off shaft.

Other objects and advantages of the present invention will become apparent to those skilled in the art, as the nature of the invention is better understood from the following disclosure and as shown in the accompanying drawings.

Figures 1, 2:
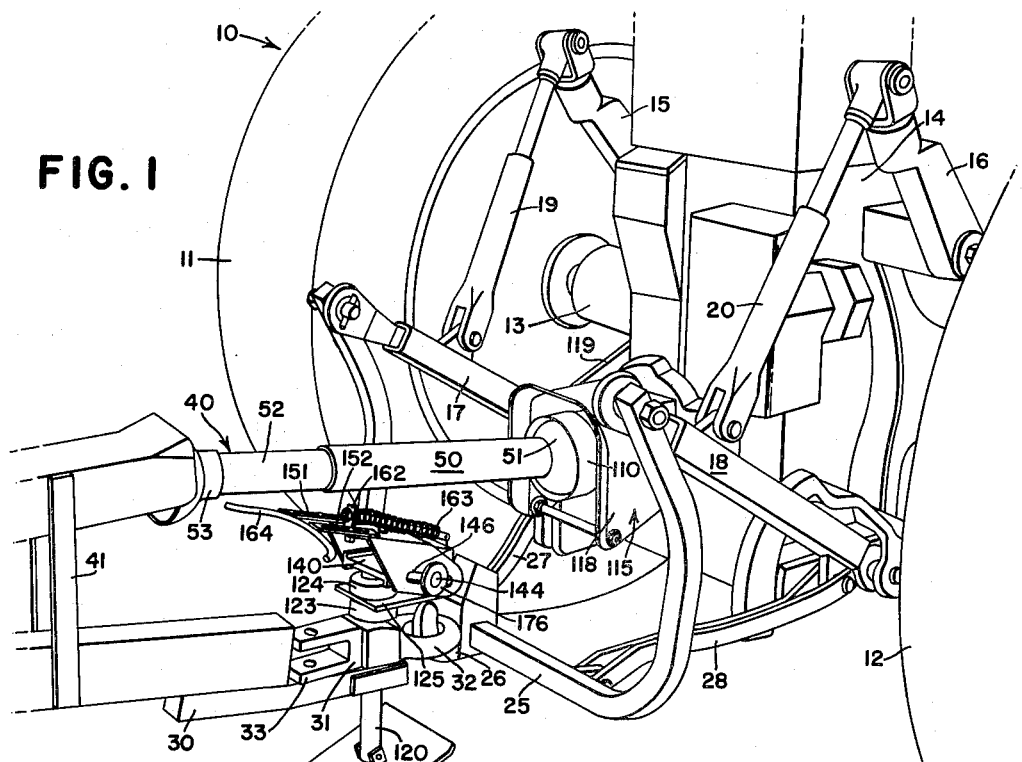
FIG. 1 is a rear and side perspective of the rear portion of the tractor and the forward end of the implement.
FIG. 2 is a view similar to FIG. 1 showing the implement detached from the tractor.

Referring to FIGS. 1 and 2, a tractor 10 includes a pair of rear traction wheels 11, 12 supported on opposite ends of an axle structure 13. The tractor 10 has a hydraulic system, not shown, but contained within the housing 14, which operates a pair of lift arms 15, 16 connected by links 19, 20 to a pair of vertically movable drawbars 17, 18. Supported on the drawbars 17, 18 is a laterally disposed drawbar structure including a depending U-shaped member 25 having opposite legs thereof pivotally mounted on the rear ends of the drawbars 17, 18 and carrying a hook member 26. Braces 27, 28 extend from the U member 25 to the forward end of the drawbars 17, 18 respectively. As is obvious, by operating the hydraulic unit of the tractor so as to raise or lower the lift arms 15, 16, the hook 26 may be moved vertically to contact the forward end of an implement.

The trail-behind implement, not shown, may be of any conventional type and for purposes of illustration includes a forwardly extending tongue or draft member 30 having at its forward end a hitch element 31 which is swivelally mounted on the forward end of the tongue 30 so as to permit either a ring 32 or a clevis type connection 33 to be swung forwardly for connection to the tractor. In the present illustration, the ring 32 is positioned forward to be received on the hook 26.

The implement further includes a drive shaft assembly 40 which is supported at its rear end by a pair of upright metal straps 41 welded to opposite sides of the draft or tongue member 30. The assembly 40 has a forward drive shaft 42 and a rear shaft 43 which telescopes over the forward shaft 42. Mounted on the forward end of the shaft 42 is a universal joint section 44 and mounted on the rear end of the shaft 43 is a universal joint section 45. Cut in the hub portions of the sections 44, 45 are a pair of annular grooves or slots 46, 47. Positioned in the slots 46, 47 are a pair of annular nylon bearings 48, 49 respectively. Safety shielding is mounted over the telescoping shafts 42, 43 and includes a forward shield section 50 enlarged or bell-shaped at its forward end 51 to accommodate rotation of the universal section 44.

The shield 50 telescopes over an inner shield member 52 which has welded to its rear end an enlarged bell-shaped shield 53 which accommodates rotation of the universal joint section 45. The nylon bearings 48, 49 bear against the internal surfaces of the telescoping sections 50 and 53 respectively. Internal of the shields 50, 52 and surrounding the telescoping shafts 42, 43 is a spring 54 which bears against the hub portions of the universal joint sections 44, 45 to bias the drive shaft assembly 40 toward extension. Generally, the drive shaft assembly has not been described in detail but only sufficiently to fully understand the present invention. However, should a more detailed description of the assembly 40 be desired, such may be had by referring to U.S. Patent 2,772,550.

Figure 3:
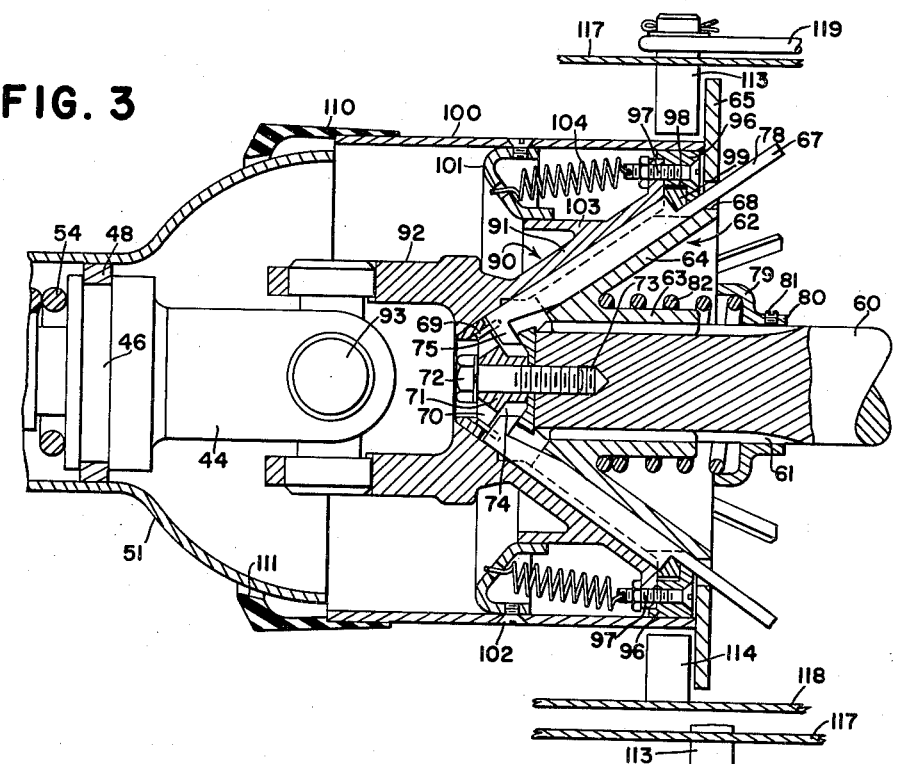
FIG. 3 is a longitudinal and vertical sectional view taken through the coupler elements showing the latter in their coupled position.

Provided on the tractor 10 is a conventional power take-off shaft 60 which projects rearwardly from the tractor body. The power take-off shaft 60 is splined at 61 to receive a cone-shaped coupling member, indicated in its entirety by the reference numeral 62. The coupler member 62 includes therein a hub portion 63 having an internal splined surface which slides over the splined surface 61. The member further includes a rearwardly facing cone-shaped portion 64 extending forwardly from the rear end of the power take-off shaft 60 and terminating at its forward end in a radial flange portion 65. The outer surface of the cone portion 64 is provided with a series of longitudinal or axial slots or grooves 66 which receive angularly spaced and longitudinally extending fingers or keys 67. The flange portion is provided with axial openings 68 in registry with the spots 66 which permit the forward ends 78 of the fingers 67 to extend through the flange. The rear end of the fingers are provided with pins 69 which are loosely received in openings 70 of a cap member 71. The cap 71 is fixed to the power take-off shaft 60 by means of a bolt 72 received in a tapped bore 73 in the end of the power take-off shaft 60. The cap 71 is further provided with an annular slot 74 which receives hooked ends 75 of the fingers 67. As may be seen from viewing FIGS. 3–5, the slot 74 is of greater length than the hooked ends 75 and due to the difference in length as well as the loose connection of the pins 70 and the opening 69 the fingers are permitted a degree of radial movement. Each of the fingers 67 is provided with the recessed or reduced forward end 78, the juncture of the reduced sections 78 and the forward ends of the fingers 67 forming an anular forwardly facing ledge in the fingers. Just forwardly of the coupler element 62 is a radial flange member 79 having a hub portion 80 provided with a set screw 81 which fixes the flange member 79 to the power take-off shaft 60. Extending between the flange member 79 and the internal surface of the cone portion 64 is a spring 82 which biases the cone portion 64 rearwardly relative to the shaft 60. Viewing specifically the coupler member 62 of FIGS. 3–5, it becomes apparent that as the flange portion 65 or the entire cone member 62 is moved forwardly the fingered portions 67 will be driven radially inwardly. As will later become apparent, it is through the latter adaptability to radially position the fingers, that the coupler elements may be engaged and disengaged to and from one another.

A second coupler element or member, indicated in its entirety by the reference numeral 90, is provided adjacent the forward end of the drive shaft 42. The coupler member 90 includes a forward conical-shaped portion 91 and an integral universal joint section 92 connected to the universal joint section 44 by a cross pin member 93 to form a conventional type of universal joint. The forward portion 91 has an internal conical surface 94 facing forwardly and having longitudinally extending or axial grooves 95, the surface 94 and grooves 95 being complementary to and for the purpose of accommodating movement of the first coupler element or member 62 and its associated fingers 67 into the second member 90. Adjacent the forward end of the coupler member 90 is a ring 96 fixed to the member 90 by means of countersunk screws 97. The ring 96 is shaped to form in conjunction with the end of the coupler member 90 an annular groove 98 in which is received a radially inwardly extending ring 99 which forms an inner flange on the coupler element 90.

Figure 4:
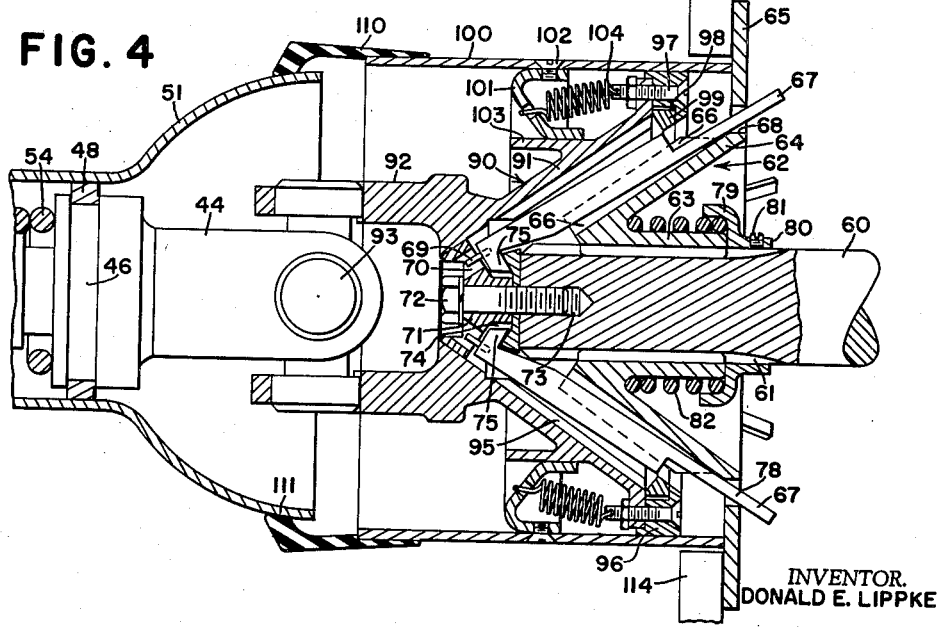
FIG. 4 is a view similar to FIG. 3 showing the coupler elements in an uncoupled position and prior to separation.
Figure 5:
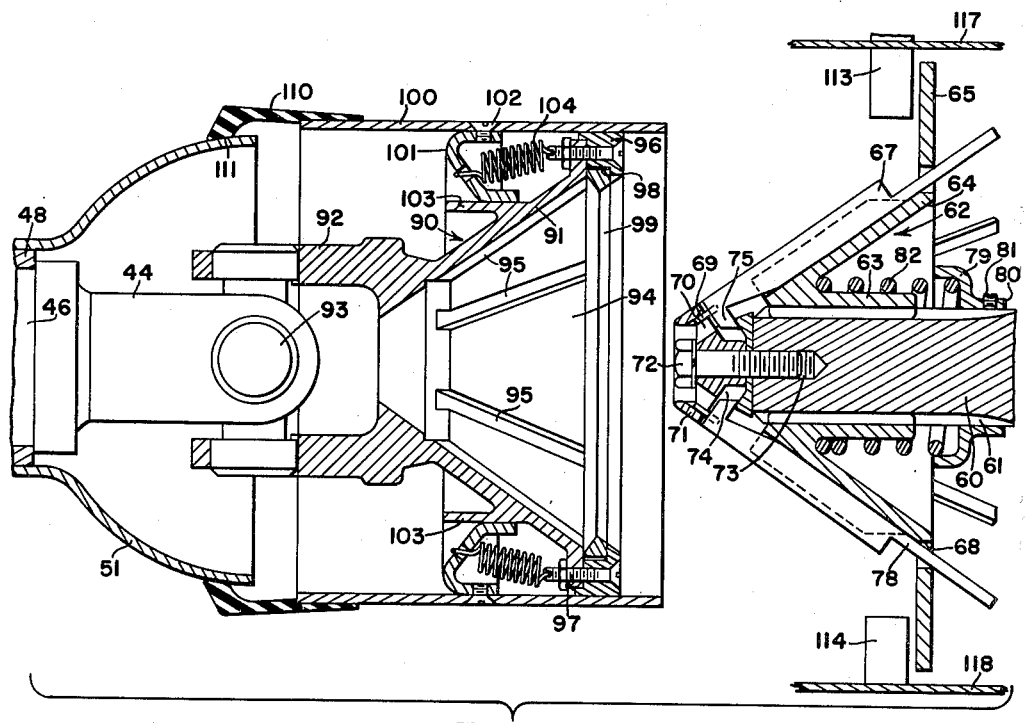
FIG. 5 is a view similar to FIG. 3 showing the coupler elements separated.
Figure 6:
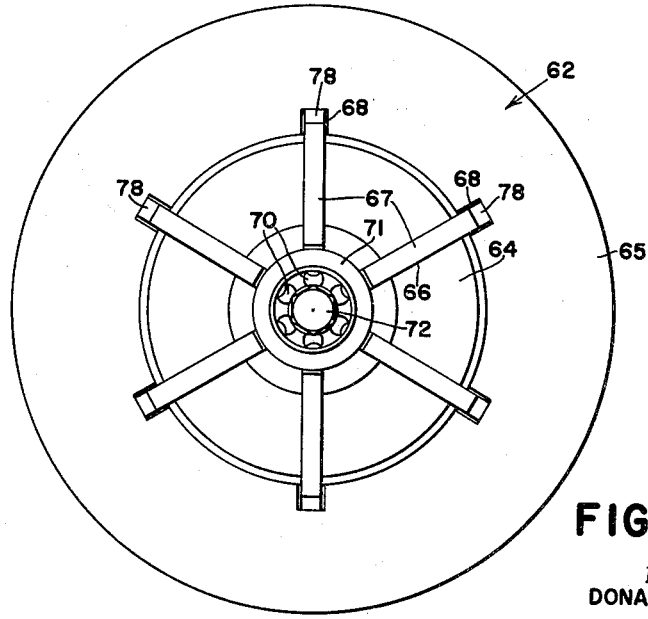
FIG. 6 is a rear view of the coupler element on the power take-off shaft.
Figure 7:
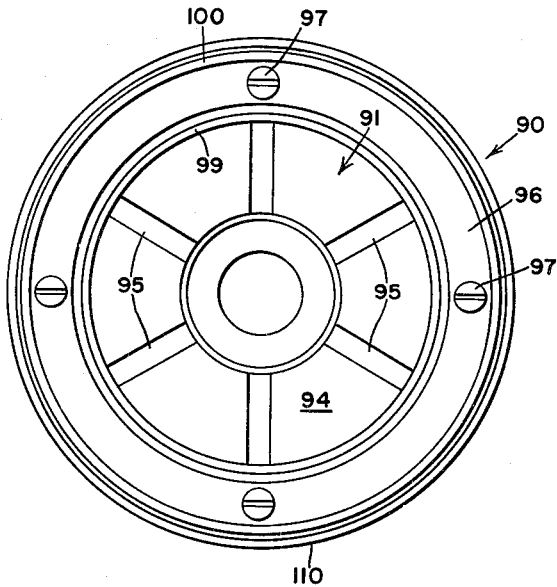
FIG. 7 is a front view looking rearwardly at the coupler element on the forward end of the implement drive shaft.
Figure 13:
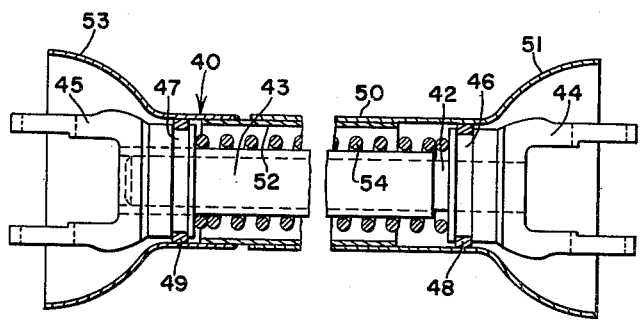
FIG. 13 is a vertical sectional view taken axially along the drive shaft assembly.
Figure 12:
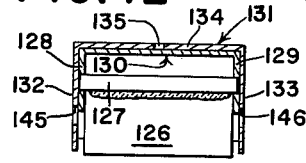
FIG. 12 is a sectional view taken substantially along the line 12—12 of FIG. 8.
Figure 9:
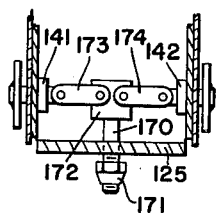
FIG. 9 is a sectional view taken substantially along the line 9—9 of FIG. 8.

Mounted adjacent the outer surface of the ring 96 is a cylindrical member or guard 100 which is slidable axially relative to the members 90 and 96. Further support is provided for the walls of the cylindrical member 100 by means of an annular spacer member 101 which is fixed to the cylindrical wall 100 by means of countersunk screws 102 and slidably engages a cylindrical wall portion 103 which is integral with and extends axially rearwardly from the cone-shaped member 90. Disposed between the spacer members 101 and connected to the rear ends of the countersunk screws 97 are a series of angularly spaced extension springs 104. The springs 104 normally operate to draw the cylindrical shell 100 forwardly relative to the coupler member 90. Provided on the rear end of the cylindrical wall 100 is a molded rubber ring 110. The rubber ring 110 has a rear portion having an inner surface 111 which engages the outer surface of the bell-shaped member 51 upon the cylindrical wall or shell 100 being in its forward position as shown in FIGS. 4 and 5. However, upon the shell 100 being drawn rearwardly to a position shown in FIG. 3, the surface 111 will be clear of the outer surface of the bell-shaped member 51. The ring 110 is composed of rubber for the purpose of maintaining a substantially rigid yet flexible connection between the bell-shaped member 51 and the coupler element 62. The rubber ring 110 serves the purpose of preventing the coupler element 90 from dropping about its universal joint due to its weight. By being of relatively rigid construction, the rubber ring 110 will retain the shell 100 and the coupler element 90 in substantially the position existing when it is uncoupled from the tractor.

Positioned on the tractor for vertical longitudinal swinging is a shield member 115 of U-shaped cross section which is pivotally connected at its front lower end 116 to swing fore and aft. The leg or wall portions 117, 118 are positioned on opposite sides of the coupler element 62. Extending inwardly from the walls 117, 118 are a pair of lugs 113, 114 positioned rearwardly of the flange 65 on the coupler member 62. The lugs 113, 114 are normally in position to contact the flange 65 to drive the flange and element 62 forwardly. The lug 113 extends through the vertical wall portion 117 and has connected at its outer end a link 119 which extends forwardly and upwardly to a position adjacent the operator's station on the tractor and which may be actuated to be drawn forwardly and rearwardly from a lever system, not shown, on the operator's station 119 to cause the shield 115 to be swung forwardly or rearwardly about the pivot 116.

The coupling here illustrated operates in the following manner. Assuming the implement is in a position as shown in FIG. 2 relative to the tractor and it is desirous to couple the implement to the tractor as shown in FIG. 1, the tractor is moved rearwardly to a position substantially adjacent to the implement and the position in which the coupler member 62 is in fore-and-aft alinement with the coupler member 90. Due to the cone-shape of the couple elements 62, 90, the elements, even if slightly off center to one another, will adjust themselves axially, the rubber ring 110 permitting such adjustment. Upon initial movement of the coupler element 62 into the coupler element 90, which is caused by rearward movement of the tractor, the internal surfaces of the rings 96, 99 will contact the outer surfaces of the fingers 67 and cause the cone members 62 to move rearwardly against the pressure of the spring 82. Rearward movement of the member 62 will cause the finger portion 67 to move radially inwardly toward the power take-off shaft 60. Upon the coupler elements 62, 90 reaching the position shown in FIG. 4 the pressure of the spring 82 will cause the finger 67 to move radially outwardly to a position in which the annular ledge created by the recessed or smaller ends 78 move behind the ring 99. At this point, the outer surface of the fingered portions 67 will probably lie adjacent the inner conical surface 94 of the couple member 90. By rotating the power take-off shaft 60, the fingered portions will move to a position adjacent the grooves 95 in the coupler member 91 whereupon they will snap radially outwardly in the grooves. At this time, the coupling will be completely coupled and rotation of the drive shaft 42, 43 may proceed. Since the spring member 54 has caused the drive shaft assembly 40 to be in extended position, coupling will occur prior to the hook 26 of the drawbar reaching the ring 32. Of course, this coupling arrangement has been described assuming that the drive shaft assembly 40 is in a correct position for the coupler member 90 to receive the coupler member 62. As will later become apparent, supporting structure is provided to so position the drive shaft assembly 40. However, should it be desired to couple the two members 62, 90 manually, the spring 54 will permit the drive shaft assembly 40 to be retracted manually so that the forward coupler element 90 may be moved rearwardly of the coupler element 62 and the force of the spring 54 will then be used to move the coupler element 90 into engagement with the coupler element 62. The rubber ring 110 will, of course, permit a considerable degree of manipulation of the forward coupler 90. Before leaving the description of the method of coupling, it should be recognized that as the spring 82 causes the fingers 67 to move radially outwardly to seat in the grooves 95, the entire coupler element 62 will be caused to move rearwardly and the flange 65 will contact the forward edge of the cylindrical shell 100 thereby causing the shell 100 to move rearwardly and to cause the surface 111 to lose contact with the surface of the bell-shaped end 51 of the drive shaft shield. Since there will be relative rotation between the cylindrical portion 100 and the shield portion 51, it is desirous to cause loss of contact between the surface 111 and the shield.

Upon it being desirable to disengage the coupling, the rod 119 may be drawn forwardly by the operator to move the lugs 113, 114 against the rear surface of the flange 65. This will cause the coupler member 62 to move forwardly thereby permitting the fingers 67 to move radially inwardly to a position substantially as shown in FIG. 4 in which the ledge created between the recessed portions 78 and the forward ends of the fingers is radially inwardly of the ring 99. Upon this occurring, disengagement of the coupler members 62, 90 may be had by merely driving the tractor forwardly and away from the implement, assuming, of course, that the drawbar coupling has also been disengaged.

At the forward end of the draft member 30 there is provided a stand which incorporates the use of a vertically disposed shaft 120 having at its lower end a shoe 121. The shaft extends upwardly from the shoe 121 through a vertically disposed sleeve 122 fixed to the forward end of the tongue 30. Positioned above the tongue 30 is the hitch element 31 and positioned adjacent the upper surface of the hitch element 31 and extending upwardly on the sleeve 122 is a pair of collars 123, 124. Sandwiched between the collars 123, 124 is an L-shaped bracket 125 having a vertically disposed leg portion 126 having welded at its upper end a transversely disposed pivot shaft 127. Pivotally mounted on opposite ends of the shaft 127 are depending leg portions 128, 129 of a U-shaped member 130. Overlying the inner U-shaped panel 130 is an outer U-shaped panel 131 having side panels 132, 133 and a back panel 134. The back panel 134 has a longitudinal slot 135 through which a bolt 136 extends for purposes of maintaining sliding contact between the U-shaped members 130, 131.

Figure 8:
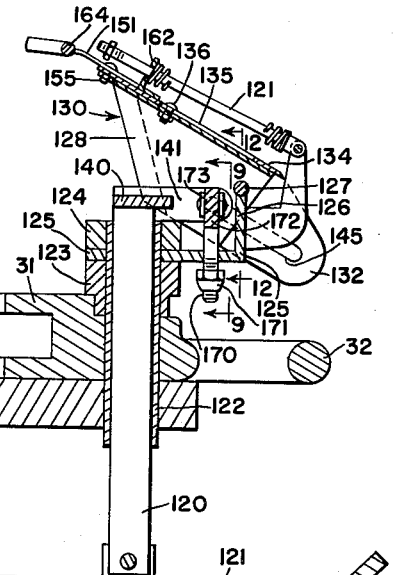
FIG. 8 is a vertical longitudinal sectional view taken through the stand and the forward portion of the tongue.

Welded to the upper end of the shaft 120 is a cross bar 140 having forwardly extending portions 141, 142 fixed to opposite ends thereof. The forward ends of the portions 141, 142 support transverse pins 143, 144 which extend through the side panels 128, 129 and 132, 133 of the U-shaped members 130, 131 respectively. Slots 145, 146 are provided in the side panels 132, 133 for receiving the pins 143, 144 for longitudinal movement relative to the outer U-shaped member 131. As may be seen from viewing FIGS. 8, 10, the pins 143, 144 are positioned rearwardly of the pivot shaft 127. Consequently, as the vertically disposed shaft 120 moves vertically relative to the tongue or draft member 30, the pivot pins 143, 144 will swing about the shafts 127 thereby causing the U-shaped members 130, 131 to rise or fall depending upon the direction of movement of the shaft 120.

Fixed to the upper surface of the back panel 134 is an upwardly extending bracket structure 150 having a pair of downwardly extending leg members 151, 152 slotted at 153, 154 respectively to receive bolt and nut combinations 155, the latter fixing the bracket structure 150 to the back panel 134. The purpose of the slots 153, 154 is to provide adjustment in the stand or support for various heights of drive shaft assemblies, such adjustment being required to modify the stand for various models and makes of tractors which may have their power take-off shafts at different heights.

Extending forwardly from the vertical plate portion 126 of the L-shaped bracket 125 is a second L-shaped bracket 160, the upper end of which pivotally supports a rod 161 extending rearwardly in a substantially parallel manner to the panel 134 and is connected to the panel 134 by an angle iron support 162. Surrounding the rod is a spring 163 which normally biases the outer U-shaped panel member 131 upwardly and rearwardly relative to the inner U-shaped panel member 130, the slots 145, 146 permitting the relative movement between the two U-shaped members 130, 131. At the upper end of the bracket structure 150 is a transverse bar 164 disposed to engage the lower or underside of the drive shaft assembly 40.

Figure 10:
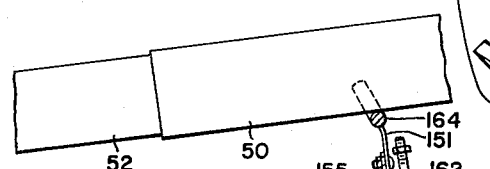
FIG. 10 is a view similar to FIG. 8 showing the stand with the drive shaft support in contact with the drive shaft.
Figure 10:
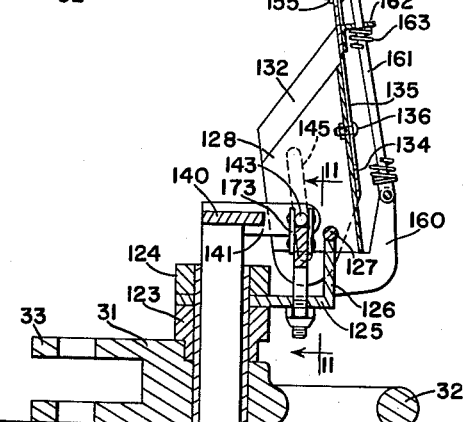
Figure 11:
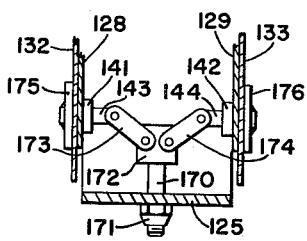
FIG. 11 is a sectional view taken substantially along the line 11—11 of FIG. 10.

As shown in FIGS. 8–11, there is provided a lock for preventing relative movement between the U-shaped members 130, 131 when the members 130, 131 are in substantially vertical position as shown in FIG. 10. The lock includes a vertically disposed shaft 170 which extends through the bracket 125 and is threaded at its lower end to receive a nut 171. On the upper end of the shaft 170 is a block 172 on which is pivotally mounted outwardly extending links 173, 174, the outer ends of which are connected to the pins 143, 144. On the outer ends of the pins 143, 144 are provided collar members 175, 176. The pins 143, 144 are free to move axially through the brackets 141, 142, the side panels 128, 129, and the side panels 132, 133 of the U-shaped members 130, 131. The collars 175, 176 are fixed to the outer ends of the pins 143, 144 and, as is shown in FIG. 11, are drawn axially inwardly, upon upward movement of the brackets relative to the shaft 170, to contact the outer surfaces of the wall panels 132, 133 thereby clamping the wall panels 132, 133 and 128, 129 together and against the brackets 141, 142. In this latter position, the U-shaped members 130, 131 are prevented from sliding relative to one another.

Referring now to the overall operation of the stand in relation to the coupling as well as the vertically movable drawbars 17, 18 on the tractor, and assuming that the implement is connected to the drawbars on the tractor and the coupling is also attached to the power take-off shaft on the tractor, the implement is first detached from the tractor by first lowering the hook member 26 and consequently the draft member 30 to a position in which the pad 121 contacts the ground. As the pad 121 contacts the ground it will drive the vertically disposed shaft 120 upwardly which in turn will swing the U-shaped members 130, 131 vertically so that the cross bar 164 contacts the underside of the drive shaft assembly 140. While in its vertical movement, the locking mechanism is not in effect and the bar 164 will tend to drive the outer slidable member 134 downwardly relative to the inner member 128. Movement downwardly will be resisted by the spring 163 so that a snug contact is maintained on the underside of the drive shaft assembly 140. As the U-shaped members 130, 131 reach their vertical position the nut 171 will engage the underside of the bracket 125 thereby limiting movement of the shaft in a vertical direction. Continuing movement of the U-shaped members will tend to draw the pins 143, 144 upwardly thereby causing the links 143, 144 to move axially inwardly so that the collars 175, 176 lock the two U-shaped members against sliding relative movement. As this point, the bar 164 has reached its maximum vertical position and the entire stand is stabilized in this position.

The positioning of the various elements in the stand mechanism occurs prior to disconnection of the power take-off shaft from the drive shaft assembly 40. Consequently, after the hook 26 is clear of the ring 32, the coupling is still in engagement. By the operator moving the rod 119 forwardly, the coupling may be disconnected and separation will occur by forward movement of the tractor. Since the drive shaft assembly 40 is supported in the position in which it is disconnected from the power take-off shaft, the drive shaft assembly will remain in that position and substantially at the height required to back a power take-off shaft and its coupler member into engagement with and contact with the drive shaft assembly.

When it is desired to again mount the implement, the tractor is backed so that engagement between the power take-off shaft and the drive shaft occurs prior to the hook 26 being positioned under the ring 32. As the hook 26 raises the forward end of the tongue 30, the reverse action of the shaft 120 occurs to draw the two U-shaped members 130, 131 downwardly to thereby disengage the contact between the drive shaft assembly 40 and the cross bar 164.

While only one form of the invention has been shown, it should be recognized that other forms and variations will occur to those skilled in the art. Therefore, it should be understood that while the present disclosure was made in detail for purposes of fully and concisely illustrating the principles of the invention, it was not the intention to narrow or limit the invention beyond the broad general concept set forth in the appended claims.

What is claimed is:

1. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a rearwardly facing cone-shaped member mounted on the power take-off shaft for axial movement relative thereto, said member having a series of axial grooves on its outer surface and a forward radial flange with axial openings angularly spaced on the order of and in alinement with the grooves; axially extending fingers seated in the grooves and extending through the openings, said fingers having alined recessed sections defining an annular ledge facing forwardly; means pivotally mounting the rear ends of the fingers on the power take-off shaft for radial movement; means biasing the cone-shaped member rearwardly; a coupler element adjacent the forward end of the drive shaft having an internal conical surface with axial grooves therein effective to receive the cone-shaped member and fingers respectively, said coupler element further having a radially inwardly extending flange portion adaptable to seat behind the annular ledge formed by the recessed portions of the fingers; means articulately connecting the coupler element to the forward end of the drive shaft; means extending between the drive shaft and the coupler element for effectively maintaining said coupler element at a desired angular relation relative to the drive shaft; a vertically disposed ground engaging shaft; means mounting the shaft on the draft member for vertical movement, said latter means being effective upon lowering the draft member to permit the shaft to move vertically relative to the draft member; a vertically swingable structure pivotally mounted on the draft member for movement between an up and down position, said structure including a pair of members slidable relative to one another for extension and retraction with one of said members being adapted for supporting engagement with the drive shaft upon said structure being in its up position; means biasing the members to extend; means connecting the shaft to the structure to effect upward and downward movement of the structure upon relative upward and downward movement respectively of the shaft in relation to the draft member; and means for locking said slidable members against relative movement, said locking means being effective only upon said structure being in its up position.

2. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a rearwardly facing cone-shaped member mounted on the power take-off shaft for axial movement relative thereto, said member having a series of axial grooves on its outer surface and a forward radial flange with axial openings angularly spaced on the order of and in alinement with the grooves; axially extending fingers seated in the grooves and extending through the openings, said fingers having alined recessed sections defining an annular ledge facing forwardly; means pivotally mounting the rear ends of the fingers on the power take-off shaft for radial movement; means biasing the cone-shaped member rearwardly; a coupler element mounted on and adjacent the forward end of the drive shaft having an internal conical surface with axial grooves therein effective to receive the cone-shaped member and fingers respectively, said coupler element further having a radially inwardly extending flange portion adaptable to seat behind the annular ledge formed by the recessed portions of the fingers; a vertically disposed ground engaging member; means mounting the ground engaging member on the draft member for vertical movement, said latter means being effective upon lowering the draft member to permit the ground engaging member to move vertically relative to the draft member; a vertically swingable structure pivotally mounted on the draft member for movement between an up and down position, said structure including a pair of members slidable relative to one another for extension and retraction with one of said members being adapted for supporting engagement with the drive shaft upon said structure being in its up position; means biasing the members to extend; means connecting the ground engaging member to the structure to effect upward and downward movement of the structure upon relative upward and downward movement respectively of the ground engaging member in relation to the draft member; and means for locking said slidable members against relative movement, said locking means being effective only upon said structure being in its up position.

3. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a rearwardly facing cone-shaped member mounted on the power take-off shaft for axial movement relative thereto, said member having a series of axial grooves on its outer surface and a forward radial flange with axial openings angularly spaced on the order of and in alinement with the grooves;

axially extending fingers seated in the grooves and extending through the openings, said fingers having alined recessed sections defining an annular ledge facing forwardly; means pivotally mounting the rear ends of the fingers on the power take-off shaft for radial movement; means biasing the cone-shaped member rearwardly; a coupler element mounted on and adjacent the forward end of the drive shaft having an internal conical surface with axial grooves therein effective to receive the cone-shaped member and fingers respectively, said coupler element further having a radially inwardly extending flange portion adaptable to seat behind the annular ledge formed by the recessed portions of the fingers; a vertically disposed ground engaging member; means mounting the ground engaging member on the draft member for vertical movement, said latter means being effective upon lowering the draft member to permit the ground engaging member to move vertically relative to the draft member; a vertically movable structure mounted on the draft member for movement between an up and down position, said structure being adapted for supporting engagement with the drive shaft upon said structure being in its up position; and means connecting the ground engaging member to the structure to effect upward and downward movement of the structure upon relative upward and downward movement respectively of the ground engaging member in relation to the draft member.

4. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a rearwardly facing cone-shaped member mounted on the power take-off shaft for axial movement relative thereto, said member having a series of axial grooves on its outer surface and a radial flange with axial openings angularly spaced and in alinement with the grooves; axially extending fingers extending through the openings, said fingers having alined recessed sections defining an annular ledge facing forwardly; means pivotally mounting the fingers on the power take-off shaft for radial movement; a coupler element mounted on and adjacent the forward end of the drive shaft having an internal conical surface with axial grooves therein effective to receive the cone-shaped member, said coupler element further having a radially extending flange portion adaptable to seat behind the annular ledge formed by the recessed portions of the fingers; means biasing the fingers radially to effect engagement between the ledge and flange to thereby prevent axial separation of the member and coupler element; a vertically movable structure mounted on the draft member for movement between an up and down position, said structure being adapted for supporting engagement with the drive shaft upon said structure being in its up position; and means on the draft member effecting movement of the structure to its up and down position in response to lowering and raising respectively of the draft member.

5. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a rearwardly facing cone-shaped member mounted on the power take-off shaft for axial movement relative thereto, said member having a series of axial grooves on its outer surface; axially extending fingers and having alined recessed sections defining an annular ledge facing forwardly; means connecting the fingers to the power take-off shaft; means biasing the cone-shaped member rearwardly to effect radial outward displacement of the fingers; a coupler element mounted on and adjacent the forward end of the drive shaft having an internal conical surface with axial grooves therein effective to receive the cone-shaped member and fingers respectively, said coupler element further having a radially inwardly extending flange portion adaptable to seat behind the annular ledge formed by the recessed portions of the fingers; a vertically disposed ground engaging member; means mounting the ground engaging member on the draft member for vertical movement, said latter means being effective upon lowering the draft member to permit the ground engaging member to move vertically relative to the draft member; a vertically movable structure mounted on the draft member for movement between an up and down position, said structure being adapted for supporting engagement with the drive shaft upon said structure being in its up position; and means connecting the ground engaging member to the structure to effect upward and downward movement of the structure upon relative upward and downward movement respectively of the ground engaging member in relation to the draft member.

6. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a rearwardly facing cone-shaped member mounted on the power take-off shaft for axial movement relative thereto, said member having a series of axial grooves on its outer surface; axially extending fingers having alined recessed sections defining an annular ledge facing forwardly; means supporting the fingers on the power take-off shaft; a coupler element mounted on and adjacent the forward end of the drive shaft having an internal conical surface with axial grooves therein effective to receive the cone-shaped member and further having a radially extending flange portion adaptable to seat behind the annular ledge formed by the recessed portions of the fingers; means biasing the fingers radially to effect engagement between the ledge and flange to thereby prevent axial separation of the member and coupler element; a vertically movable structure mounted on the draft member for movement between an up and down position, said structure being adapted for supporting engagement with the drive shaft upon said structure being in its up position; and means on the draft member effecting movement of the structure to its up and down position in response to lowering and raising respectively of the draft member.

7. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a support member mounted on the power take-off shaft; axially extending fingers connected at their rear ends to the support member and projecting radially, said fingers having alined recessed sections defining an annular ledge facing forwardly; a coupler element mounted on and adjacent the forward end of the drive shaft having an internal conical surface with axial grooves therein effective to receive the fingers, said coupler element further having a radially extending flange portion adaptable to seat behind the annular ledge formed by the recessed portions of the fingers; means biasing the fingers radially to effect engagement between the ledge and flange to thereby prevent axial separation of the member and coupler element; a vertically disposed ground engaging member; means mounting the ground engaging member on the draft member for vertical movement, said latter means being effective upon lowering the draft member to permit the ground engaging member to move vertically relative to the draft member; a vertically movable structure mounted on the draft member for movement between an up and down position, said structure being adapted for supporting engagement with the drive shaft upon said structure being in its up position; and means connecting the ground engaging member to the structure to effect upward and downward movement of the structure upon relative upward and downward movement respectively of the ground engaging member in relation to the draft member.

8. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a support member mounted on the power take-off shaft; axially extending fingers connected at their rear ends to the support member and projecting radially outwardly and forwardly, said fingers having alined recessed sections defining an annular ledge facing forwardly; means biasing the fingers radially; a coupler element mounted on and adjacent the forward end of the drive shaft having an internal conical surface with axial grooves therein effective to receive the fingers, said coupler element further having a radially extending flange portion adaptable to seat behind the annular ledge formed by the recessed portions of the fingers; a vertically movable structure mounted on the draft member for movement between an up and down position, said structure being adapted for supporting engagement with the drive shaft upon said structure being in its up position; and means on the draft member effecting movement of the structure to its up and down position in response to lowering and raising respectively of the draft member.

9. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a support member mounted on the power take-off shaft; axially extending fingers on the support member projecting radially; a coupler element mounted on and adjacent the forward end of the drive shaft having an internal grooved surface effective to receive portions of the fingers, said coupler element further having a flange portion adaptable to seat behind portions of the fingers for preventing axial separation of the member and element; means biasing said latter portions of the fingers radially to engage the flange portion; a vertically disposed ground engaging member; means mounting the ground engaging member on the draft member for vertical movement, said latter means being effective upon lowering the draft member to permit the ground engaging member to move vertically relative to the draft member; a vertically swingable structure pivotally mounted on the draft member for movement between an up and down position, flsaid structure including a pair of members slidable relative to one another for extension and retraction with one of said members being adapted for supporting engagement with the drive shaft upon said structure being in its up position; means biasing the members to extend; means connecting the ground engaging member to the structure to effect upward and downward movement of the structure upon relative upward and downward movement respectively of the ground engaging member in relation to the draft member; and means for locking said slidable members against relative movement, said locking means being effective only upon said structure being in its up position.

10. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a support member mounted on the power take-off shaft; axially extending fingers on the support member projecting radially; a coupler element mounted on and adjacent the forward end of the drive shaft having an internal grooved surface effective to receive portions of the fingers, said coupler element further having a flange portion adaptable to seat behind portions of the fingers for preventing axial separation of the member and element; means biasing said latter portions of the fingers radially to engage the flange portion; a vertically disposed ground engaging member; means mounting the ground engaging member on the draft member for vertical movement, said latter means being effective upon lowering the draft member to permit the ground engaging member to move vertically relative to the draft member; a vertically movable structure mounted on the draft member for movement between an up and down position, said structure being adapted for supporting engagement with the drive shaft upon said structure being in its up position; and means connecting the ground engaging member to the structure to effect upward and downward movement of the structure upon relative upward and downward movement respectively of the ground engaging member in relation to the draft member.

11. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising; a support member mounted on the power take-off shaft; axially extending fingers on the support member projecting radially; a coupler element mounted on and adjacent the forward end of the drive shaft having an internal grooved surface effective to receive portions of the fingers, said coupler element further having a flange portion adaptable to seat behind portions of the fingers for preventing axial separation of the member and element; means biasing said latter portions of the fingers radially to engage the flange portion; a vertically movable structure mounted on the draft member for movement between an up and down position, said structure being adapted for supporting engagement with the drive shaft upon said structure being in its up position; and means on the draft member effecting movement of the structure to its up and down position in response to lowering and raising respectively of the draft member.

12. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a member mounted on one of the aforesaid shafts; locking fingers on the member projecting radially; a coupler element mounted on and adjacent the end of the other of the aforesaid shafts having an axial portion projecting to lie adjacent to the member to effect an overlapping relation between the member and element, said portion having a surface effective to couple the shafts for rotation in unison, said coupler element further having a flange portion adaptable to seat behind portions of the fingers for preventing axial separation of the member and element; a vertically disposed ground engaging member; means mounting the ground engaging member on the draft member for vertical movement, said latter means being effective upon lowering the draft member to permit the ground engaging member to move vertically relative to the draft member; a vertically movable structure mounted on the draft member for movement between an up and down position, said structure being adapted for supporting engagement with the drive shaft upon said structure being in its up position; and means connecting the ground engaging member to the structure to effect upward and downward movement of the structure upon relative upward and downward movement respectively of the ground engaging member in relation to the draft member.

13. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a member mounted on one of the aforesaid shafts; locking fingers on the member projecting radially; a coupler element mounted on and adjacent the end of the other of the aforesaid shafts having an axial portion projecting to lie adjacent to the member to effect an overlapping relation between the member and element, said portion having a surface effective to receive portions of the fingers to couple the shafts for rotation in unison, said coupler element further having a flange portion adaptable to seat behind portions of the fingers for preventing axial separation of the member and element; a vertically movable structure mounted on the draft member for movement between an up and down position, said structure being adapted for supporting engagement with the drive shaft upon said structure being in its up position; and means on the draft member effecting movement of the structure to its up and down position in response to lowering and raising respectively of the draft member.

14. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a member mounted on one of the aforesaid shafts; locking fingers on the member projecting radially; a coupler element mounted on and adjacent the end of the other of the aforesaid shafts having an axial portion projecting to lie adjacent the member to effect an overlapping relation between the member and element, said portion having a surface effective to receive the fingers to couple the shafts for rotation in unison; a vertically disposed ground engaging member; means mounting the ground engaging member on the draft member for vertical movement, said latter means being effective upon lowering the draft member to permit the ground engaging member to move vertically relative to the draft member; a vertically swingable structure pivotally mounted on the draft member for movement between an up and down position, said structure including a pair of members movable relative to one another for extension and retraction with one of said members being adapted for supporting engagement with the drive shaft upon said structure being in its up position; means biasing the members to extend; means connecting the ground engaging member to the structure to effect upward and downward movement of the structure upon relative upward and downward movement respectively of the ground engaging member in relation to the draft member; and means for locking said slidable members against relative movement, said locking means being effective only upon said structure being in its up position.

15. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a member mounted on one of the aforesaid shafts; locking fingers on the member projecting radially; a coupler element mounted on and adjacent the end of the other of the aforesaid shafts having an axial portion projecting to lie adjacent to the member to effect an overlapping relation between the member and element, said portion having a surface effective to receive the fingers to couple the shafts for rotation in unison; a vertically disposed ground engaging member; means mounting the ground engaging member on the draft member for vertical movement, said latter means being effective upon lowering the draft member to permit the ground engaging member to move vertically relative to the draft member; a vertically movable structure mounted on the draft member for movement between an up and down position, said structure being adapted for supporting engagement with the drive shaft upon said structure being in its up position; and means connecting the ground engaging member to the structure to effect upward and downward movement of the structure upon relative upward and downward movement respectively of the ground engaging member in relation to the draft member.

16. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a member mounted on one of the aforesaid shafts; axial locking fingers on the member projecting radially; a coupler element mounted on and adjacent the end of the other of the aforesaid shafts having an axial portion projecting to lie adjacent to the member to effect an overlapping relation between the member and element, said portion having a surface effective to engage the member to couple the shafts for rotation in unison, said coupler element further having a radial surface adapted to set behind the fingers to prevent axial separation; and a vertically movable structure mounted on the draft member for movement between an up and down position, said structure being adapted for supporting engagement of the drive shaft upon said structure being in its up position; and means on the draft member effecting movement of the structure to its up and down position in response to lowering and raising respectively of the draft member.

17. A coupler assembly for a tractor-implement combination, the tractor having an operator's station and a rearwardly projecting power take-off shaft and the implement having a forwardly projecting drive shaft, said coupler assembly comprising: a rearwardly facing cone-shaped member mounted on the power take-off shaft for axial movement relative thereto, said member having a series of axial grooves on its outer surface and a radial flange portion with axial openings radially spaced on the order of and in alinement with the grooves; axially extending fingers seated in the grooves and extending through the openings, said fingers having recessed sections; means pivotally mounting the fingers on the power take-off shaft for radial movement; means biasing the cone-shaped member rearwardly; a coupler element adjacent the forward end of the drive shaft having an internal conical surface with axial grooves therein effective to receive the cone-shaped member and fingers respectively, said coupler element further having a radially inwardly extending flange portion adaptable to seat in the recessed portions of the fingers; means articulately connecting the coupler element to the forward end of the drive shaft; means extending between the drive shaft and the coupler element for effectively maintaining said coupler element at the desired angular relation relative to the drive shaft; and a mechanism extending from and controllable from the operator's station engageable with the radial flange portion and operative to effect axial movement of the cone-shaped member for adjusting the fingers radially to engage or disengage the inwardly extending flange portion of the coupler element.

18. A coupler assembly for a tractor-implement combination, the tractor having an operator's station and a rearwardly projecting power take-off shaft and the implement having a forwardly projecting drive shaft, said coupler assembly comprising: a rearwardly facing cone-shaped member mounted on the power take-off shaft for axial movement relative thereto, said member having a series of axial grooves on its outer surface and a radial flange portion with axial openings radially spaced on the order of and in alinement with the grooves; axially extending fingers seated in the grooves and extending through the openings, said fingers having alined radial recessed sections; means pivotally mounting the fingers on the power take-off shaft for radial movement; means biasing the cone-shaped member rearwardly; a coupler element adjacent the forward end of the drive shaft having a conical surface with axial grooves therein effective to receive the cone-shaped member and fingers respectively, said coupler element further having a radially extending flange portion adaptable to seat in the recessed portions of the fingers; and a mechanism extending from and controllable from the operator's station engageable with the radial flange portion and operative to effect axial movement of the cone-shaped member for adjusting the fingers radially to engage or disengage the inwardly extending flange portion of the coupler element.

19. A coupler assembly for a tractor-implement combination, the tractor having a rearwardly projecting power take-off shaft and the implement having a forwardly projecting drive shaft, said coupler assembly comprising: a rearwardly facing cone-shaped member mounted on the power take-off shaft for axial movement relative thereto, said member having a series of axial grooves on its outer surface and a radial flange portion with axial openings radially spaced on the order of and in alinement with the grooves; axially extending fingers seated in the grooves and extending through the openings, said fingers having alined radial recessed sections; means pivotally mounting the fingers on the power take-off shaft for radial movement; means biasing the cone-shaped member rearwardly; a coupler element adjacent the forward end of the drive shaft having a conical surface with axial grooves therein and effective to receive the cone-shaped member and fingers respectively, said coupler element further having a radially extending flange portion adaptable to seat in the recessed portions of the fingers; means articulately connecting the coupler element to the forward end of the drive shaft; and means extending between the drive shaft and the coupler element for effectively maintaining said coupler element at the desired angular relation relative to the drive shaft.

20. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a coupling having a first part on the power take-off shaft and a second part on the drive shaft and automatically engageable upon the tractor backing to cause the first part to contact the second part; means on the tractor for uncoupling the parts; a vertically disposed ground engaging shaft; means mounting the shaft on the draft member for vertical movement, said latter means being effective upon lowering the draft member to permit the shaft to move vertically relative to the draft member; a vertically swingable structure pivotally mounted on the draft member for movement between an up and down position, said structure including a pair of members movable relative to one another for extension and retraction with one of said members being adapted for supporting engagement with the drive shaft upon said structure being in its up position; means biasing the members to extend; means connecting the shaft to the structure to effect upward and downward movement of the structure upon relative upward and downward movement respectively of the shaft in relation to the draft member; and means for locking said movable members against relative movement, said locking means being effective only upon said structure being in its up position.

21. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a coupling having a first part on the power take-off shaft and a second part on the drive shaft and automatically engageable upon the tractor backing to cause the first part to contact the second part; means on the tractor for uncoupling the parts; a vertically disposed ground engaging member; means mounting the ground engaging member on the draft member for vertical movement, said latter means being effective upon lowering the draft member to permit the ground engaging member to move vertically relative to the draft member; a vertically swingable structure pivotally mounted on the draft member for movement between an up and down position, said structure including a pair of members movable relative to one another for extension and retraction with one of said members being adapted for supporting engagement with the drive shaft upon said structure being in its up position; means biasing the members to extend; means connecting the ground engaging member to the structure to effect upward and downward movement of the structure upon relative upward and downward movement respectively of the ground engaging member in relation to the draft member; and means for locking said movable members against relative movement, said locking means being effective only upon said structure being in its up position.

22. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a coupling having a first part on the power take-off shaft and a second part on the drive shaft and automatically engageable upon the tractor backing to cause the first part to contact the second part; means on the tractor for uncoupling the parts; a vertically disposed ground engaging member; means mounting the ground engaging member on the draft member for vertical movement, said latter means being effective upon lowering the draft member to permit the ground engaging member to move vertically relative to the draft member; a vertically movable structure mounted on the draft member for movement between an up and down position, said structure being adapted for supporting engagement with the drive shaft upon said structure being in its up position; and means connecting the ground engaging member to the structure to effective upward and downward movement of the structure upon relative upward and downward movement respectively of the ground engaging member in relation to the draft member.

23. A hitch assembly for a tractor-implement combination, the tractor having a vertically movable drawbar and a rearwardly projecting power take-off shaft and the implement having a forwardly projecting draft member engageable with the drawbar and a forwardly projecting drive shaft, said hitch assembly comprising: a coupling having a first part on the power take-off shaft and a second part on the drive shaft and automatically engageable upon the tractor backing to cause the first part to contact the second part and to automatically lock said parts against relative axial and rotary movement; means on the tractor for uncoupling the parts; a vertically movable structure mounted on the draft member for movement between an up and down position. said structure being adapted for supporting engagement with the drive shaft upon said structure being in its up position; and means on the draft member effecting movement of the structure to its up and down position in response to lowering and raising respectively of the draft member.

24. A coupler assembly for a tractor-implement combination, the tractor having an operator's station and a rearwardly projecting power take-off shaft and the implement having a forwardly projecting drive shaft, said coupler assembly comprising: a member mounted on one of the aforesaid shafts; axially extending locking fingers supported on the member and projecting radially; a coupler element articulately connected to and adjacent the end of the other of the aforesaid shafts having an axial portion projecting to lie adjacent to the member to effect an overlapping relation between the member and element, said portion having a surface effective to receive the fingers to couple the shafts for rotation in unison and a radial surface engaging the fingers for preventing axial separation, said coupler element further having a wall structure with an outer annular surface movable relative to the shaft the element is connected, said latter shaft having an annular wall structure attached thereto adjacent to the aforesaid wall structure; a flexible ring structure interconnecting the two wall structures and of such characteristic as to maintain the coupler element in a restricted angular relation to its shaft when the element is disconnected from the member and flexible to permit articulation when connected; and a mechanism extending from and controllable from the operator's station operative to effect adjustment of the fingers to engage or disengage the coupler element.

References Cited in the file of this patent

UNITED STATES PATENTS

| | | |
|---|---|---|
| 809,759 | Toole et al. | Jan. 9, 1906 |
| 2,869,660 | Miller et al. | Jan. 20, 1959 |